J. OSBORN.
Hydrostatic Valves.
No. 151,423. Patented May 26, 1874.
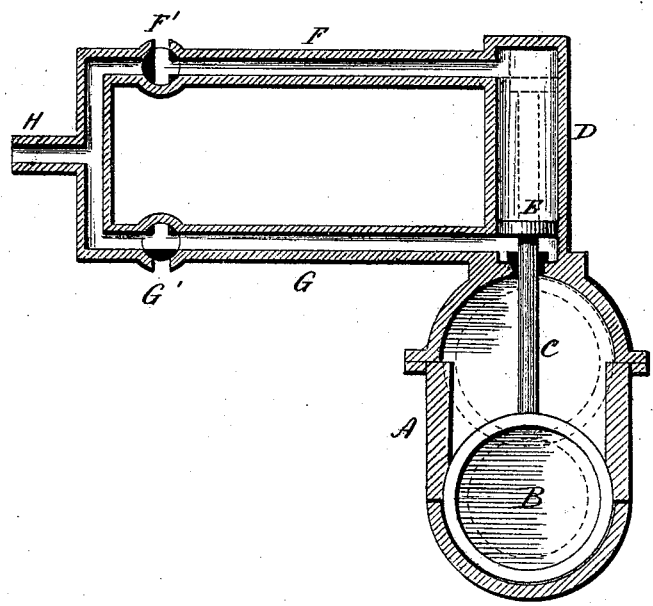
Witnesses
J. H. Shumway
A. J. Tibbits
John Osborn
Inventor
By Atty.
John J. Earle

UNITED STATES PATENT OFFICE.

JOHN OSBORN, OF NEW HAVEN, CONNECTICUT.

IMPROVEMENT IN HYDROSTATIC VALVES.

Specification forming part of Letters Patent No. 151,423, dated May 26, 1874; application filed April 2, 1874.

*To all whom it may concern:*

Be it known that I, JOHN OSBORN, of New Haven, in the county of New Haven and State of Connecticut, have invented a new Improvement in Hydrostatic Valve; and I do hereby declare the following, when taken in connection with the accompanying drawing and the letters of reference marked thereon, to be a full, clear, and exact description of the same, and which said drawing constitutes part of this specification, and represents a sectional view.

This invention relates to an improvement in the method of working valves in water-mains, or other purposes, where the valve-stem cannot be readily reached; and it consists in combining with the valve a cylinder and piston, with pipes leading thereto, by which water or other medium may be forced into the cylinder above or below the piston, as the case may be, to raise or lower the piston, and correspondingly open or close the valve.

A is the valve-chamber; B, the valve; C, the valve-rod, which may be of any known construction, but substantially such as shown. Upon the valve-chamber, or at a convenient adjacent point thereto, a cylinder, D, is arranged axially with the valve-rod. Within the cylinder, and attached to the valve-rod, is the piston E, so as to traverse freely between the extremes of the cylinder. The upward movement of the piston to the position denoted in the broken lines opens or correspondingly raises the valve, and the return of the piston correspondingly closes the valve. To work the piston a pipe, F, leads into the cylinder above the piston, and a pipe, G, below, these pipes provided, respectively, with a three-way cock, F' G', and, preferably, the two pipes are brought to one common pipe, H, through which the supply of water or other medium flows under pressure.

The operation is as follows: Suppose the valve to be closed as shown, and it is desired to open it. Turn the cock G' to open the pipe G into communication with the supply, and turn the cock F' to open the pipe F to waste, as shown. The water flows into the cylinder beneath the piston, and forces it to rise and carry with it the valve B, the water above the piston passing out through the cock F' until the desired height is attained; then close the cocks. To return the piston and close the valve: Reverse the order of opening the cocks F' G', and the water will flow into the cylinder above the piston and out from below it.

By this arrangement I am enabled to operate a valve at a great distance, or in a position which could not be otherwise conveniently reached.

I claim as my invention—

The combination of the cylinder D, its piston E, pipes F and G, provided with suitable cut-offs, with valve B and chamber A, substantially as described.

JOHN OSBORN.

Witnesses:
JOHN E. EARLE,
A. J. TIBBITS.